June 30, 1953  S. D. RUSSELL  2,643,551
BELT TIGHTENER
Original Filed Feb. 17, 1945
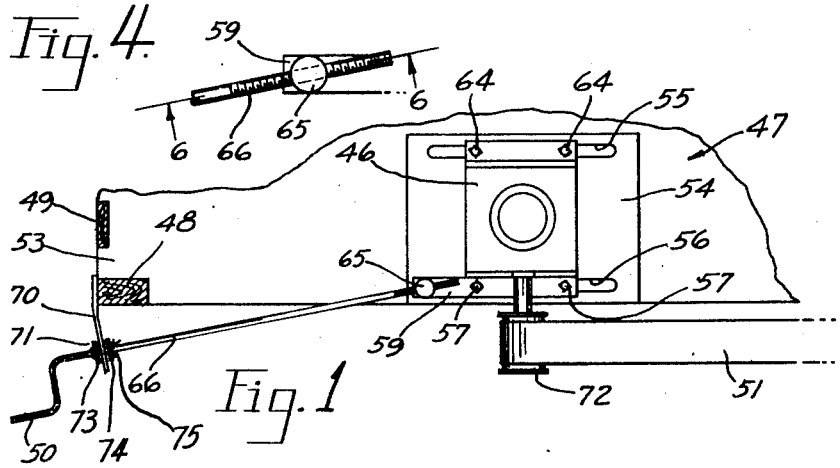
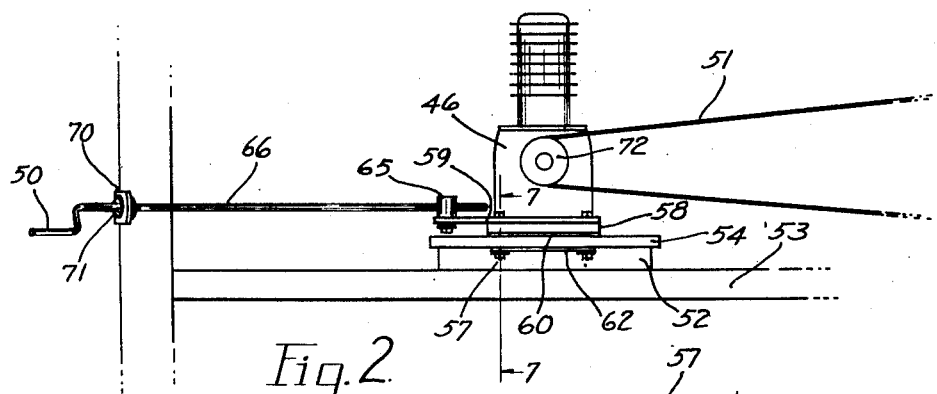
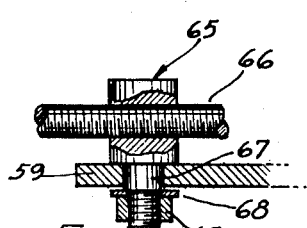
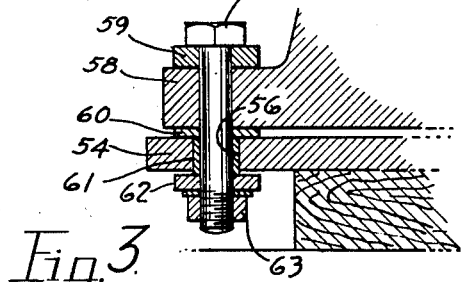
Inventor
STANLEY D. RUSSELL
By Emerson B. Donnell
Attorney Patented June 30, 1953

2,643,551

UNITED STATES PATENT OFFICE 2,643,551

BELT TIGHTENER

Stanley D. Russell, Racine, Wis., assignor to J. I. Case Company, Racine, Wis., a corporation of Wisconsin Original application February 17, 1945, Serial No. 578,371, now Patent No. 2,494,360, dated January 10, 1950. Divided and this application January 9, 1950, Serial No. 137,508

10 Claims. (Cl. 74—242.14)

The present invention relates to engine bases or bases for other prime motors or mechanisms, and particularly to that type which is movable for adjusting a belt leading from the engine or other mechanisms. The present application is a division of my co-pending application Serial Number 578,371, filed February 17, 1945, which has become Patent No. 2,494,360, dated January 10. 1950.

An object of the present invention is to generally improve the construction and operation of devices of this class.

A further object is to provide means for shifting an engine or other device having a pulley so that it can serve the purposes of a clutch and a belt tightening idler whereby it is possible to dispense with other expedients for these purposes.

A still further object is to provide means for shifting an engine or other device having a pulley wherein said shifting means is positioned obliquely or non-parallel to the direction of movement of the shiftable engine.

Another object is to provide a means for shifting the engine which will adjust itself obliquely with respect to the engine as the engine is moved.

Other objects and advantages will become apparent from the following specifications and accompanying drawings in which a satisfactory embodiment of the invention is shown. However, it is to be understood that this invention is not limited to the details disclosed but includes also any variations and modifications which fall within the spirit of the invention as herein expressed.

In the drawings,

Fig. 1 shows a plan view of the engine applied to a machine such as a loader.

Fig. 2 is a side elevation of the device disclosed in Fig. 1.

Fig. 3 is a sectional view taken on the line 7—7 of Fig. 2.

Fig. 4 is an enlarged detail of certain mechanisms indicated in Fig. 1.

Fig. 5 is a sectional view taken substantially on the line 6—6 of Fig. 4.

In the manufacture of farm machinery, such for example as balers, loaders and the like, it is essential that satisfactory mechanism be provided at the very least possible cost. These machines are commonly driven by internal combustion engines, not adapted to starting readily under large loads. Furthermore, the simplest convenient drive from such an engine in an inexpensive machine is commonly a belt which, with the comparatively short centers commonly required, ordinarily must have some means for adjusting its tension. This has been accomplished in the past by the use of some sort of an idler pulley which has been a somewhat troublesome and needless complication. Also in order to facilitate starting of an engine, it has often been provided with a clutch which adds appreciably to the cost and provides one more place which is difficult to repair in the case of failure after long usage.

In the present invention I have provided an engine which is supported on a loader so as to be movable along a predetermined path by means of a belt tightening means or crank. In the manufacture of this type of machinery it is often found impossible due to the location of certain structural members of the machine, to position a crank or tightening means in line with the belt which situation I have overcome by the following expedient.

Turning to Fig. 1 I have shown an engine 46 installed on a loader generally designated as 47 which has an upright 48 and a brace 49, which would interfere with the location of a crank 50 in line with a belt 51, driving parts of the loader not shown.

For slidably positioning the engine 46 on the loader 47, a block 52 is fastened on a deck 53 of the loader and carries a plate 54 having slots 55 and 56. Bolts 57—57 traverse a flange 58, Fig. 3 constituting part of the base of the engine 46 and pass through slot 56 to form guides for sliding the engine on the plate 54. A strap 59 is engaged under the heads of bolts 57 and a bearing strip 60 is interposed between flange 58 and plate 54. A spacer 61 surrounds bolt 57 within slot 56 and serves to space a guiding strap 62 a slight distance beneath plate 54. A nut 63 clamps the several parts together in rigid relation so that a freely slidable bearing is provided for engine 46 without appreciable up-and-down play.

Bolts 64—64 are provided on the other side of engine 46 the arrangement being substantially identical, although strap 59 may be omitted if desired.

Strap 59, in the present instance, extends to the left of the engine 46, as seen in Fig. 2, and is engaged by a fitting generally designated as 65, having a threaded bore engaging a threaded shaft 66 connected with crank 50.

Fitting 65 has a neck 67 journaled in a suitable bore in strap 59 and a washer 68 is shouldered on neck 67 and clamped by a nut 69. Thus fitting 65 may swivel freely in strap 59 and sufficient freedom is provided to avoid binding.

It is to be noted that engine 46 is ordinarily of substantial weight and causes a considerable friction drag on the plate 54 when the strap 59 is shifted. Also belt 51 exerts a reaction against the pulley of the engine which is in the same direction as the reaction caused by said friction drag during tightening movement. Shaft 66, as shown in Fig. 1, engages the unit comprised by engine 46 and straps 59, 60 etc., at a point between the point or center of frictional resistance and the center of pull of the belt. In this manner, there is no objectionable tendency toward swinging of the engine and bending of the bolts 57 and 64 in slots 55 and 56.

In the present instance, because of the incroachment of brace 49, on the space which might be desirable for shaft 66, the latter has been inclined somewhat from a direction parallel to belt 51 and is supported in a bracket 70 fixed on upright 48, a thrust bearing 71 being provided for preventing endwise movement of the shaft 66 in the bracket 70. The bearing 71 comprises a washer 73 welded or otherwise fixed with shaft 66 and a washer 74 removably maintained on the shaft in the present instance by a cotter pin or the like 75. Sufficient freedom is allowed in bearing 71 to provide for the slight swinging of shaft 66 due to the movement of engine 46 in a direction which is non-parallel with shaft 66.

As above stated, the point of attachment of the shaft 66 to the strap 59 is offset so that the force of the pull of the shaft 66 when the crank 50 is manipulated occurs at a point between the reaction of the belt 51 and the point of application of the friction drag caused by the weight of the engine 16. The exact point of application of the force of the shaft 66 is best determined by experiment but in general it will be so located that the distance transverse to belt 51 from the belt to the shaft will be related to the distance from the shaft to the center of frictional resistance inversely as the value of the belt pull is related to the value of the frictional resistance. By manipulating the crank 50 engine 46 may be readily moved back and forth to tighten or loosen belt 51 about pulley 72 in the manner of a friction clutch thus dispensing with the necessity for this element. It should be appreciated that the swivelly secured fitting 65 and the bearings 71 allow the shaft 66 to adjust itself obliquely with respect to the engine 46 as the engine is moved to the right or to the left as seen in Fig. 1 thereby preventing the occurrence of binding in the shaft 66 within the limits of movement of the engine 46.

I claim:

1. In a belt tightener and power controlling device for an implement, the combination of a support carried by the implement, a prime mover on the support and adapted to be slidable thereon, a pulley rotatably carried by said prime mover, a belt on said pulley receiving power therefrom and transmitting it to a point of use on the implement, said support providing a slot extending in the direction in which it is desired to shift said prime mover in order to tighten and loosen said belt, a strap portion on said prime mover, a plurality of spaced bolts extending through a portion of said prime mover and through said strap portion and said slot, spacers on said bolts also extending through said slot, a guiding means engaged with said bolts, and nuts engaged with said bolts and clamping said strap, said portion of said prime mover, said spacers and said guiding means rigidly together, said spacers being of a length to space said guiding means sufficiently from said prime mover portion to provide for free sliding of said prime mover on said support regardless of the clamping effect of said nuts on said strap, said prime mover, said spacers, and said guiding means.

2. In a belt tightener and power controlling device for an implement the combination of a support carried by the implement, a prime mover on the support and adapted to be slidable thereon, a pulley rotatably carried by said prime mover, a belt on said pulley receiving power therefrom and transmitting it to a point of use on the implement, said support providing a slot extending in the direction in which it is desired to shift said prime mover in order to tighten and loosen said belt, a plurality of spaced bolts extending through a portion of said prime mover and said slot, spacers on said bolts also extending through said slot, a guiding means engaged with said bolts, and nuts engaged with said bolts and clamping said portion of said prime mover, said spacers and said guiding means rigidly together, said spacers being of a length to space said guiding means sufficiently from said prime mover portion to provide for free sliding of said prime mover on said support regardless of the clamping effect of said nuts on said prime mover, said spacers and said guiding means.

3. In a belt tightener and power controlling device for an implement the combination of a support carried by the implement, a prime mover on the support and adapted to be slidable thereon, a pulley rotatably carried by said prime mover, a belt on said pulley receiving power therefrom and transmitting it to a point of use on the implement, said support providing a plurality of spaced parallel slots extending in the direction in which it is desired to shift said prime mover in order to tighten and loosen said belt, a strap portion on said prime mover one end of said strap extending from said prime mover parallel to the path of movement of said prime mover, a pluraltiy of spaced bolts extending through a portion of said prime mover and through said strap portion and said slots, spacers on said bolts also extending through said slots, a guiding means engaged with said bolts, nuts engaged with said bolts and clamping said strap, said portion of said prime mover, said spacers and said guiding means rigidly together, said spacers being of a length to space said guiding means sufficiently from said prime mover portion to provide for free sliding of said prime mover on said support regardless of the clamping effect of said nuts on said strap, said prime mover, said spacers and said guiding means, a fitting swivelly secured to said extended portion of said strap, a shaft threadedly engaged with said fitting and extending therefrom in the general direction of said belt but oblique to said slots, and thrust bearing means fixed on said implement and engaged with said shaft and constituted to provide for swinging thereof caused by the change of angle of said shaft as a result of guided movement of said engine base on said support.

4. In a belt tightening and power controlling device for an implement the combination of a support carried by the implement, a plate carried by the support, an engine base on the plate and adapted to be slidable thereon, a pulley rotatably carried by said engine base, a belt on the pulley receiving power therefrom and transmitting it to a point of use on the implement, said plate providing a slot extending in the direction in which it is desired to move said engine base in order to tighten and loosen said belt, a plurality of spaced bolts rigidly clamped on said engine base and extending through said slot and freely slidable therein while so clamped in said engine base for relatively free-guided movement of said engine base on said plate, a fitting swivelly secured to said engine base, a shaft threadedly engaged with said fitting and extending therefrom in the general direction of said belt but oblique to said slot, and a thrust bearing carried by said implement for supporting said shaft and of a type for preventing endwise movement of said shaft in either direction, said thrust bearing being of a size sufficient to provide for swinging of the shaft therein caused by the change of angle of said shaft as a result of guided movement of said engine base on said plate in either direction upon turning said shaft.

5. In a belt tightening and power controlling device for an implement the combination of a support carried by the implement, an engine base on the support and adapted to be slidable thereon, a pulley rotatably carried by said engine base, a belt on the pulley and receiving power therefrom and transmitting it to a point of use on the implement, said support providing a slot extending in the direction in which it is desired to move said engine base in order to tighten and loosen said belt, a plurality of spaced bolts clamped on said engine base and extending through said slot and freely slidable therein while so clamped in said engine base for relatively free-guided movement of said engine base on said support, a fitting swivelly secured to said engine base, a shaft threadedly engaged with said fitting and extending therefrom in the general direction of said belt but oblique to said slot, and a thrust bearing carried by said implement for supporting said shaft and of a type for preventing endwise movement of said shaft in either direction, said thrust bearing being of a size sufficient to provide for swinging of the shaft therein caused by the change of angle of said shaft as a result of guided movement of said engine base on said support in either direction upon turning of said shaft.

6. In a belt tightening and power controlling device for an implement the combination of a support carried by the implement, an engine base on the support and adapted to be slidable thereon, a pulley rotatably carried by said engine base, a belt on the pulley and receiving power therefrom and transmitting it to a point of use on the implement, said support providing a plurality of spaced parallel slots extending in the direction in which it is desired to move said engine base in order to tighten and loosen said belt, a plurality of spaced bolts clamped on said engine base and extending through said slots and freely slidable therein while so clamped on said engine base for relatively free-guided movement of said engine base on said support, a fitting swivelly secured to said engine base, a shaft threadedly engaged with said fitting and extending therefrom in the general direction of said belt but oblique to said slots, and a thrust bearing carried by said implement for supporting said shaft and of a type for preventing endwise movement of said shaft in either direction, said thrust bearing being of a size sufficient to provide for swinging of the shaft therein caused by the change of angle of said shaft as a result of guided movement of said engine base on said support in either direction upon turning of the shaft.

7. In a belt tightener for an implement for moving a movable frame along a predetermined path on a stationary frame, an upright frame member in the path of movement of said movable frame, a threaded shaft positioned non-parallel to the path of movement of said movable frame, means carried by said upright frame member and extending substantially transversely to the path of movement of said movable frame for supporting one end of said shaft for preventing endwise movement thereof in either direction, and means for swivelly securing the other end of said shaft to said movable frame for moving said movable frame on said stationary frame when said shaft is rotated in said swivel means.

8. In a belt tightener for an implement for moving a movable frame along a predetermined path on a stationary frame, an upright frame member in the path of movement of said movable frame, a threaded shaft positioned obliquely to the path of movement of said movable frame, a thrust bearing supported by said upright frame member substantially transversely to the path of movement of said movable frame for supporting one end of said shaft and preventing endwise movement thereof in either direction, sufficient freedom being allowed in said bearing for slight swinging of said shaft, and means for swivelly securing the other end of said shaft to said movable frame for moving said movable frame in either direction when said shaft is rotated, said shaft obliquely positioning itself with respect to movement of said movable frame.

9. In a belt tightener for an implement, a stationary frame, an engine base supported on the stationary frame, and means for shifting the engine base along a predetermined path on said stationary frame including a threaded shaft positioned non-parallel to the path of movement of said engine base, a tapped fitting swivelly secured to said movable frame for securing one end of said threaded shaft therein, an upright frame member in the path of movement of said engine base, a bracket secured to said upright frame member and extending therefrom substantially transversely to the path of movement of said engine base, and a thrust bearing on said bracket for supporting said shaft for moving said engine base in response to turning of said threaded shaft.

10. In a belt tightener for an implement, a stationary frame, a prime mover supported on said stationary frame, a strap secured with said prime mover and protruding therefrom, and means for shifting the prime mover along a predetermined path on said stationary frame including a threaded shaft positioned obliquely to the path of movement of said prime mover, a tapped fitting swivelly secured with said protruding portion of said strap for securing one end of said threaded shaft therein so as to position said shaft substantially parallel with the horizontal, frame members in the path of movement of said prime mover, a bracket secured to one of said frame members and extending therefrom substantially transversely to the path of movement of said prime mover, and a thrust bearing on said bracket for supporting said shaft for moving said prime mover in response to turning of said threaded shaft, sufficient freedom being allowed in said bearing for slight swinging of said shaft when said prime mover is moved.

STANLEY D. RUSSELL.

References Cited in the file of this patent

UNITED STATES PATENTS

| Number | Name | Date |
|---|---|---|
| 1,278,846 | Budd | Sept. 17, 1918 |
| 1,511,336 | Hoey | Oct. 14, 1924 |
| 2,089,381 | Kassing | Aug. 10, 1937 |